(No Model.)

L. DION.
FLEXIBLE CONDUCTOR AND INCLOSED CONDUIT THEREFOR.

No. 546,005. Patented Sept. 10, 1895.

Witnesses.
Robert Everett.
Dennis Sumby.

Inventor:
Léon Dion
By James L. Norris.
Atty.

UNITED STATES PATENT OFFICE.

LÉON DION, OF NATICK, MASSACHUSETTS.

FLEXIBLE CONDUCTOR AND INCLOSED CONDUIT THEREFOR.

SPECIFICATION forming part of Letters Patent No. 546,005, dated September 10, 1895.

Application filed February 20, 1895. Serial No. 539,113. (No model.)

*To all whom it may concern:*

Be it known that I, LÉON DION, a citizen of the United States, residing at Natick, in the county of Middlesex and State of Massachusetts, have invented new and useful Improvements in Systems of Electrical Propulsion of Railway-Cars, of which the following is a specification.

My invention relates to systems of electrical propulsion of railway-cars, and particularly that class or type in which the conducting-mains are placed in closed subways or conduits.

My invention has for its purpose the provision of a subway or conduit for the main electrical conductor which supplies current to the car-motors, said subway being wholly inclosed from end to end and having no slot-rail or trolley-opening by which the trolley-bar on the car reaches the electrical conductor. It is my object, in this connection, to provide a closed subway or conduit of this type with a main electric conductor insulated within said conduit and a novel form of auxiliary conductor which shall possess electrical conductivity and be subject also to magnetic attraction, said auxiliary conductor being continuous throughout and possessing such elasticity or flexibility, due to its mechanical construction, as shall enable it to be lifted by one or more traveling magnets upon the car and brought into electrical contact with the under side or inner surface of the top or cover of the conduit, the latter being composed of electrically-isolated surface plates, whereby the current from the supply-conductor shall be imparted to brushes having superficial contact with the surface plates.

The invention consists, to the several ends specified, in the novel features of construction and in the parts and combinations of parts hereinafter fully described, and then particularly pointed out and defined in the claim forming part of this specification.

To enable those skilled in the art to which my invention pertains to fully understand and to construct and use the same, I will proceed to describe said invention in detail, reference being had for such purpose to the accompanying drawings, in which—

Figure 1:
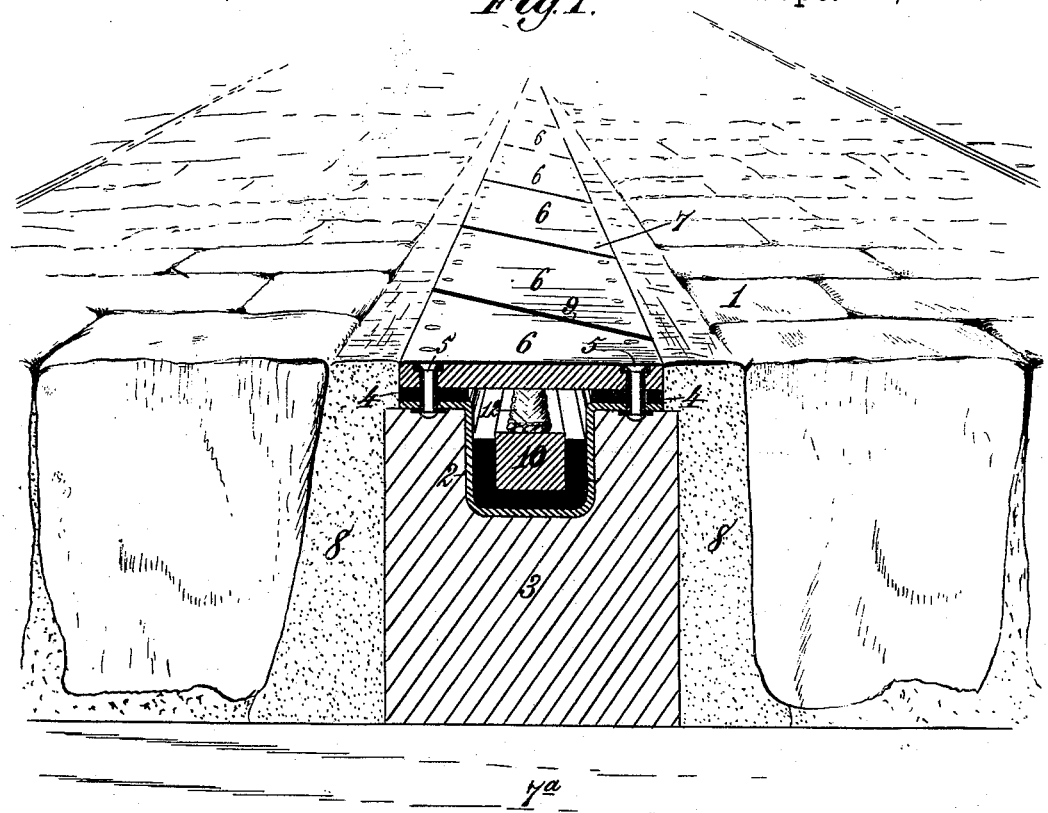
Figure 2:
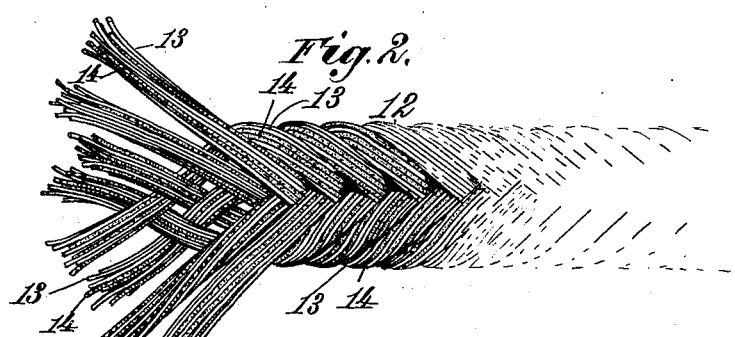
Figure 3:
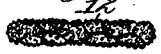

Figure 1 is a transverse section of a roadway, with the road-bed partly in perspective, showing a closed conduit constructed and equipped in accordance with my invention. Fig. 2 is a detail view enlarged, showing a portion of the auxiliary conductor and illustrating its construction. Fig. 3 is a cross-section of the auxiliary conductor.

The reference-numeral 1 in said drawings indicates the road-bed of an electric railway having a conduit or subway 2 arranged between the rails. The conduit is formed by channeling a body 3 of wood, though I may use any other suitable material or composition of materials, and laying the lower portion of the conduit in the channel thus formed. Said lower portion is trough-shaped and may be formed of any material which is adapted to the purpose. An insulating-strip 4 is inserted between each side of the conduit and the surface plates, which are secured in place by rivets 5 or other suitable fastenings, which are also insulated in any ordinary manner. The top or cover of the conduit consists of a series of similarly-shaped plates 6, having such form in cross-section as to seat upon the insulating-strips 4 covering the horizontal side portions of the conduit. The upper and outer face of each surface plate is flat to form a contact-face 7 for the trolley or brush, which travels thereon with either rolling or sliding friction, the former being in some respects regarded as preferable. The longitudinal body 3 of wood or other material is usually supported upon transverse sleepers 7, the surface plates being substantially flush with the roadway. A filling 8 of cement may be laid upon each side as deep as required, and the remainder of the roadway may be paved in the usual manner. The surface plates 6 are separated one from another by narrow intervals 9, which cross the outer or contact face diagonally in order that the trolley or brush in traversing said face may be continuously in electrical contact with any two adjacent plates, thus avoiding successive and abrupt, although momentary, interruptions of the current.

The main conductor 10 is preferably square or rectangular, though its form is subject to variation. It is usually formed of copper, or of a metal having suitable conductivity, and is arranged in the conduit in any suitable manner, the proportions of the parts being relatively such that the flat upper surface lies near the lower or inner faces of the surface plates 6. Upon the main conductor 10 lies an auxiliary conductor 12, formed of material which has a suitable electrical conductivity and is susceptible to magnetic attraction without becoming permanently magnetic. Soft iron is usually employed for the latter purpose and copper is preferred for the former, as these metals possess these characteristics.

For the purpose of securing complete flexibility at every point, together with a suitable elasticity and a capacity for longitudinal elongation and contraction, I prefer to make the auxiliary conductor in the form of a continuous strip or filament, which is composed of strands of soft-iron wires 13, interbraided with strands of copper wires 14. When formed in this manner, a suitable degree of elasticity is imparted by the mechanical construction and independently of such qualities existent in the component parts of the strip. I am thus enabled to use wires which are soft, whereby the iron strands will not become permanently magnetized and the copper will be a more perfect conductor. Moreover, the entire absence of temper in these metals renders the auxiliary conductor more flexible and enables it, therefore, to be more readily lifted and held in better electrical contact with the surface plates.

Inasmuch as the surface plates are entirely non-magnetic, but capable of electrical conduction, there is no danger that the auxiliary conductor will adhere to said plates by reason of any residual magnetism. I am able, therefore, to use both metals of which the auxiliary conductor is formed on the outside of the latter, as there is no objection to bringing both in contact with the surface plates.

The distinguishing feature of this invention lies in the auxiliary conductor composed of strands of interbraided copper and iron wires or filaments, whereby a suitable electrical conductivity and magnetic attraction are provided, together with a high degree of flexibility and elasticity, due to the mechanical structure and not to the presence of these qualities in the materials composing said strands, which would involve hardening or tempering said metals, whereby the iron would become permanently saturated with magnetism. An auxiliary conductor of this type is especially adapted to be used in a closed conduit having an interiorly-insulated main conductor and a series of conducting but non-magnetic surface plates, through which current may be transmitted by way of the auxiliary conductor to the motor on the car.

What I claim is—

In an electrical railway, having a closed conduit, or subway, the combination with a series of conducting surface-plates, forming the top of said conduit, said sections being insulated one from another, of an auxiliary conductor formed of interbraided strands of iron wire and copper wire, and a main conductor inclosed within and insulated from the lower portion of said conduit and adapted to supply current to the auxiliary conductor, the latter being drawn by magnetic attraction against the lower faces of the surface plates, substantially as described.

In testimony whereof I have hereunto set my hand and affixed my seal in presence of two subscribing witnesses.

LÉON DION. [L. S.]

Witnesses:
 JAMES L. NORRIS,
 THOS. A. GREEN.